US012432826B2

(12) United States Patent
Fan

(10) Patent No.: US 12,432,826 B2
(45) Date of Patent: Sep. 30, 2025

(54) LIGHT EMITTING ELEMENT DRIVER WITH SHUNT DIMMING FUNCTION AND CONTROL METHODS THEREOF

(71) Applicant: Chengdu Monolithic Power Systems Co., Ltd., Chengdu (CN)

(72) Inventor: Zilin Fan, Hangzhou (CN)

(73) Assignee: Chengdu Monolithic Power Systems Co., Ltd., Sichuan (CN)

(*) Notice: Subject to any disclaimer, the term of this patent is extended or adjusted under 35 U.S.C. 154(b) by 72 days.

(21) Appl. No.: 18/611,816

(22) Filed: Mar. 21, 2024

(65) Prior Publication Data

US 2024/0324078 A1 Sep. 26, 2024

(30) Foreign Application Priority Data

Mar. 22, 2023 (CN) ......................... 202310288304.1

(51) Int. Cl.

*H05B 45/10* (2020.01)
*H05B 45/3725* (2020.01)
*H05B 47/16* (2020.01)
*H05B 47/165* (2020.01)

(52) U.S. Cl.

CPC ......... *H05B 45/10* (2020.01); *H05B 45/3725* (2020.01); *H05B 47/16* (2020.01); *H05B 47/165* (2020.01)

(58) Field of Classification Search

CPC ...... H05B 45/10; H05B 47/16; H05B 47/165; H05B 45/3725

See application file for complete search history.

(56) References Cited

U.S. PATENT DOCUMENTS

| | | | | |
|---|---|---|---|---|
| 9,398,653 | B2 | 7/2016 | Kuang et al. | |
| 9,467,039 | B2 | 10/2016 | Kuang et al. | |
| 2017/0251535 | A1* | 8/2017 | Huang .............. | H02M 3/33507 |
| 2025/0185136 | A1* | 6/2025 | Fan ........................ | H05B 45/37 |

* cited by examiner

*Primary Examiner* — Monica C King
(74) *Attorney, Agent, or Firm* — Perkins Coie LLP

(57) ABSTRACT

A control circuit for a light emitting element driver having a power converter and a shunt switch connected in parallel with the light emitting element. The control circuit has a first control circuit and a second control circuit. The first control circuit provides a dimming process signal and a shunt control signal based on a dimming signal. The second control circuit receives the dimming process signal and a feedback signal representative of an output current of the power converter. When the shunt control signal is at a first level, the shunt switch is turned on, the second control circuit controls the power converter to work in a normal power operation state or a low power operation state. And when the shunt control signal is at a second level, the shunt switch is turned off, the power converter is controlled to work in the normal power operation state.

20 Claims, 6 Drawing Sheets

LIGHT EMITTING ELEMENT DRIVER WITH SHUNT DIMMING FUNCTION AND CONTROL METHODS THEREOF

CROSS-REFERENCE TO RELATED APPLICATIONS

This application claims the benefit of CN application 202310288304.1, filed on Mar. 22, 2023, and incorporated herein by reference.

TECHNICAL FIELD OF THE INVENTION

The present invention generally relates to electronic circuits, and more particularly but not exclusively, to a control circuit used in a light emitting element driver and associated control methods.

BACKGROUND OF THE INVENTION

Light emitting elements, especially LEDs (Light Emitting Diode), are widely used in current electronic products, such as architectural lighting, automotive lights, backlights for mobile phones and various screens, etc. In order to meet different applications, it is necessary to provide a dimming function for the light emitting elements, which means that a LED driver should be able to support the dimming function. Taking a LED as an example, as a current-driven device, the brightness of the LED depends on an average current flowing through the LED. In other words, the brightness of the LED device can be controlled by adjusting the average current flowing through the LED.

The prior LED drivers often receive a pulse dimming signal. The average current flowing through the LED is controlled by adjusting a duty cycle of the pulse dimming signal, to adjust the brightness of the LED. However, when a driving current provided by the LED driver has a relatively high level while a deep dimming for the LED is required, e.g., the dimming duty cycle is less than 5%, since only small part of the energy is used, most of the energy is bypassed or dissipated, the efficiency of the LED driver will be low. Furthermore, if the pulse dimming signal changes frequently, e.g., the duty cycle of the pulse dimming signal and the frequency are both in an unstable state, the brightness of the LED may vary unevenly and is not smooth, and it is difficult to achieve precise dimming with the prior technology.

SUMMARY OF THE INVENTION

An embodiment of the present invention discloses a control circuit for a light emitting element driver. The light emitting element driver has a power converter for providing an output current to the light emitting element, and a shunt switch connected in parallel with the light emitting element. The control circuit comprises a first control circuit and a second control circuit. The first control circuit is configured to receive a dimming signal, and to provide a dimming process signal and a shunt control signal based on the dimming signal, wherein both the dimming process signal and the shunt control signal have a first level and a second level. The second control circuit is configured to receive the dimming process signal and a feedback signal representative of the output current. When the shunt control signal is at a first level, the shunt switch is turned on, the second control circuit is configured to control the power converter to work in a normal power operation state and a low power operation state in a time-sharing manner. And when the shunt control signal is at a second level, the shunt switch is turned off, the second control circuit is configured to control the power converter to work in the normal power operation state.

Another embodiment of the present invention discloses a light emitting element driver. The light emitting element driver comprises a power converter for providing an output current for the light emitting element, a shunt switch coupled in parallel with the light emitting element, a first control circuit and a second control circuit. The first control circuit is configured to receive a dimming signal, and to provide a dimming process signal and a shunt control signal based on the dimming signal, wherein both the dimming process signal and the shunt control signal have a first level and a second level. The second control circuit is configured to receive the dimming process signal and a feedback signal representative of the output current. When the shunt control signal is at a first level, the shunt switch is turned on, the second control circuit is configured to control the power converter to work in a normal power operation state or a low power operation stat. And when the shunt control signal is at a second level, the shunt switch is turned off, the second control circuit is configured to control the power converter to work in the normal power operation state.

Yet another embodiment of the present invention discloses a control method for a light emitting element driver. The light emitting element driver has a power converter for providing an output current to a light emitting element, and a shunt switch connected in parallel with the light emitting element. The control method comprises the following steps. A dimming signal is received. A dimming process signal and a shunt control signal are provided based on a logic state of the dimming signal, wherein both the dimming process signal and the shunt control signal have a first level and a second level. A feedback signal representative of the output current is provided. When the shunt control signal is at a first level, the shunt switch is turned on, the power converter is controlled to work in a normal power operation state or a low power operation state. When the shunt control signal is at a second level, the shunt switch is turned off, the power converter is controlled to work in the normal power operation state.

BRIEF DESCRIPTION OF DRAWINGS

The present invention can be further understood with reference to the following detailed description and the appended drawings, wherein like elements are provided with like reference numerals.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be comprised within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

The embodiments described below will take specific circuits and some application backgrounds as examples to illustrate the light emitting element driver, the control circuit and the control method, so that those skilled in the art can better understand this present invention. However, those skilled in the art should understand that these descriptions are only exemplary, and thus are not intended to limit the scope of the present invention.

Figure 1:
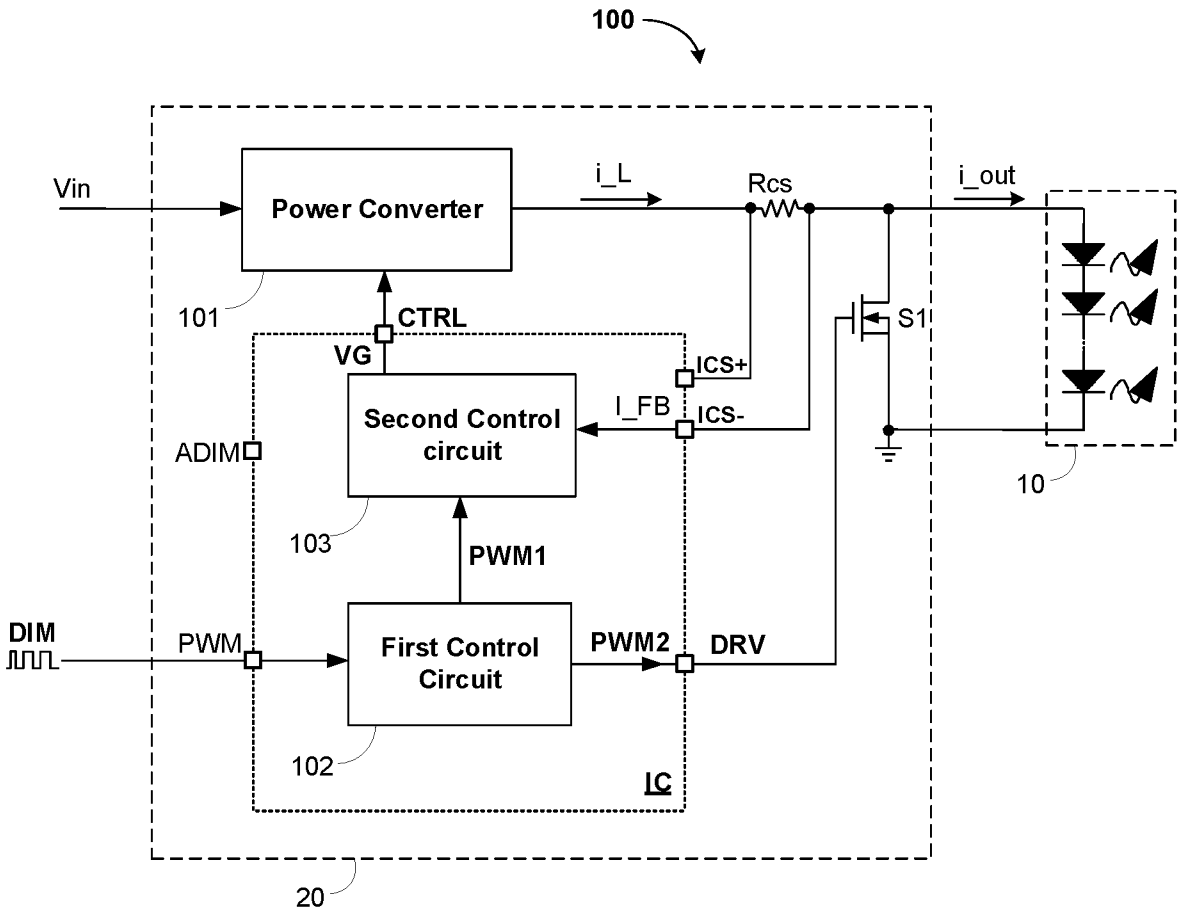
FIG. 1 shows a block diagram of a light emitting element driving system 100 in accordance with an embodiment of the present invention.

FIG. 1 shows a block diagram of a light emitting element driving system 100 in accordance with an embodiment of the present invention. The light emitting element driving system 100 comprises a light emitting element 10 and a light emitting element driver 20. The light emitting element 10 may comprise one LED, or a series-parallel structure of multiple LED strings. Inn other embodiments, the light emitting element driver 20 can also be used to drive other suitable light emitting elements, such as solid-state lighting devices.

As shown in FIG. 1, the light emitting element driver 20 comprises a power converter 101, a shunt switch S1 coupled in parallel with the light emitting element 10, a first control circuit 102 and a second control circuit 103. The power converter 101 is configured to receive an input voltage Vin at an input terminal and to convert the input voltage Vin into an output current about for driving for the light emitting element 10 at an output terminal. The power converter 101 comprises at least one main power switch and an energy storage inductor, and can adopt any suitable topology including various DC-to-DC converters, AC-to-DC converters, e.g., buck converters, boost converters, buck-boost converters, flyback circuits, etc. The shunt switch S1 comprises a field effect transistor or other forms of controllable switches. The shunt switch S1 is coupled in parallel with the light emitting element 10. The shunt switch S1 is configured to be selectively turned on and off, to configure an inductor current i_L provided by the power converter 101 as the output current i_out.

In the embodiment shown in FIG. 1, the first control circuit 102 and the second control circuit 103 are both integrated in a driving integrated circuit IC, to form a high-efficiency light emitting element driver 20 for precise dimming control. As shown in FIG. 1, the first control circuit 102 is coupled between a dimming pin PWM and a driving pin DRV. The first control circuit 102 is configured to receive an external dimming signal DIM and to provides a dimming process signal PWM1 and a shunt control signal PWM2 in a current cycle, based on a logic state of the dimming signal DIM in a last cycle. Both the dimming process signal PWM1 and the shunt control signal PWM2 have a first level and a second level. In one embodiment, when the dimming pin PWM is pulled up to a logic high level, the first control circuit 102 will be disabled, and the shunt switch S1 remains off-state.

As shown in FIG. 1, the shunt control signal PWM2 is provided to a control terminal of the shunt switch S1 and is configured to realize precise shunt dimming. When the dimming signal DIM with high frequency and high time resolution is sent to the dimming pin PWM, the first control circuit 102 is configured to provide an inverted signal with the same frequency and duty cycle as the shunt control signal PWM2, to control the shunt switch S1 coupled in parallel with the light emitting element 10. When the shunt switch S1 is turned on, a voltage across the light emitting element 10 is substantially zero, and the power converter 101 works in a normal power operation state and a low power operation state in a time-sharing manner based on the control of the dimming process signal PWM1. These two states will be described later in detail with the reference of the second control circuit 103. In one embodiment, when the shunt switch S1 is turned off, the power converter 101 is configured to control the switching of its main power switch through a control signal CTRL generated by the second control circuit 103, and to convert the input voltage Vin into the output current i_out for providing an output power to the light emitting element 10.

Since the output of the power converter 101 has a start-up delay and a turn-off delay, this limits the frequency of a traditional PWM dimming and a depth of the dimming duty cycle. Compared with the prior art, the embodiments of this invention at least have the following advantages. On the one hand, the output current i_out provided by the power converter 101 can be quickly bypassed by adding the shunt dimming. On the other hand, during the on-state of the shunt switch S1, the power converter 101 can be switched between the normal power operation and the low power operation state based on the logic state of the dimming process signal PWM1. In detail, when the power converter 101 switches to the normal power operation, the output current provided by the power converter 101 keeps continuous, which can avoid a long delay of rising time and falling time when the inductor current fluctuates. And when the power converter 101 switches to the low power operation, which can reduce unnecessary power loss. Therefore, according to the embodiments of the present invention, not only the dimming range is wider, and the linearity is higher, but also the efficiency of the entire light emitting element driving system 100 is improved.

In the embodiment shown in FIG. 1, the second control circuit 103 is coupled to the first control circuit 102 to receive the dimming process signal PWM1, and also is coupled to current detection pins (i.e., ICS+, ICS−) to receive a feedback signal VCS representative of the output current i_out. In detail, when the dimming process signal PWM1 has a logic high level, the power converter 101 maintains the power operation state, the second control circuit 103 is configured to control the switching of its power switch of the power converter 101, and to convert the input voltage Vin into the inductor current i_L based on the feedback signal VCS, to provide the driving current and the output power for the light emitting element 10. When the dimming process signal PWM1 has a logic low level, switching of the main power switch in the power converter 101 is disabled, and the power converter 101 no longer provides driving current and the output power for the light emitting element 10, so that the power converter 101 enters the low power operation state. Meanwhile, the first control circuit 102 and the second control circuit 103 of the power converter 101 still need to keep working to maintain their control functions. In other words, when the dimming process signal PWM1 has the logic high level, the power converter 101 maintains the normal power operation. The term "normal power operation" here is defined as a case where the output current is adjusted in a controllable manner, the input voltage from an input power source is delivered to the light emitting element 10 in the controllable manner. When the dimming process signal PWM1 has the logic low level, the power converter 101 exits the normal power operation state and is switched to enter the low power operation state, so the power loss is reduced and the efficiency is improved.

Although in the embodiment shown in FIG. 1, the first control circuit 102 and the second control circuit 103 are modularized in an enclosure e.g., the integrated circuit driver IC. However, in other embodiments, one or both of the first control circuit 102 and the second control circuit 103 may also be implemented by separate control circuits without integration.

Figure 2:
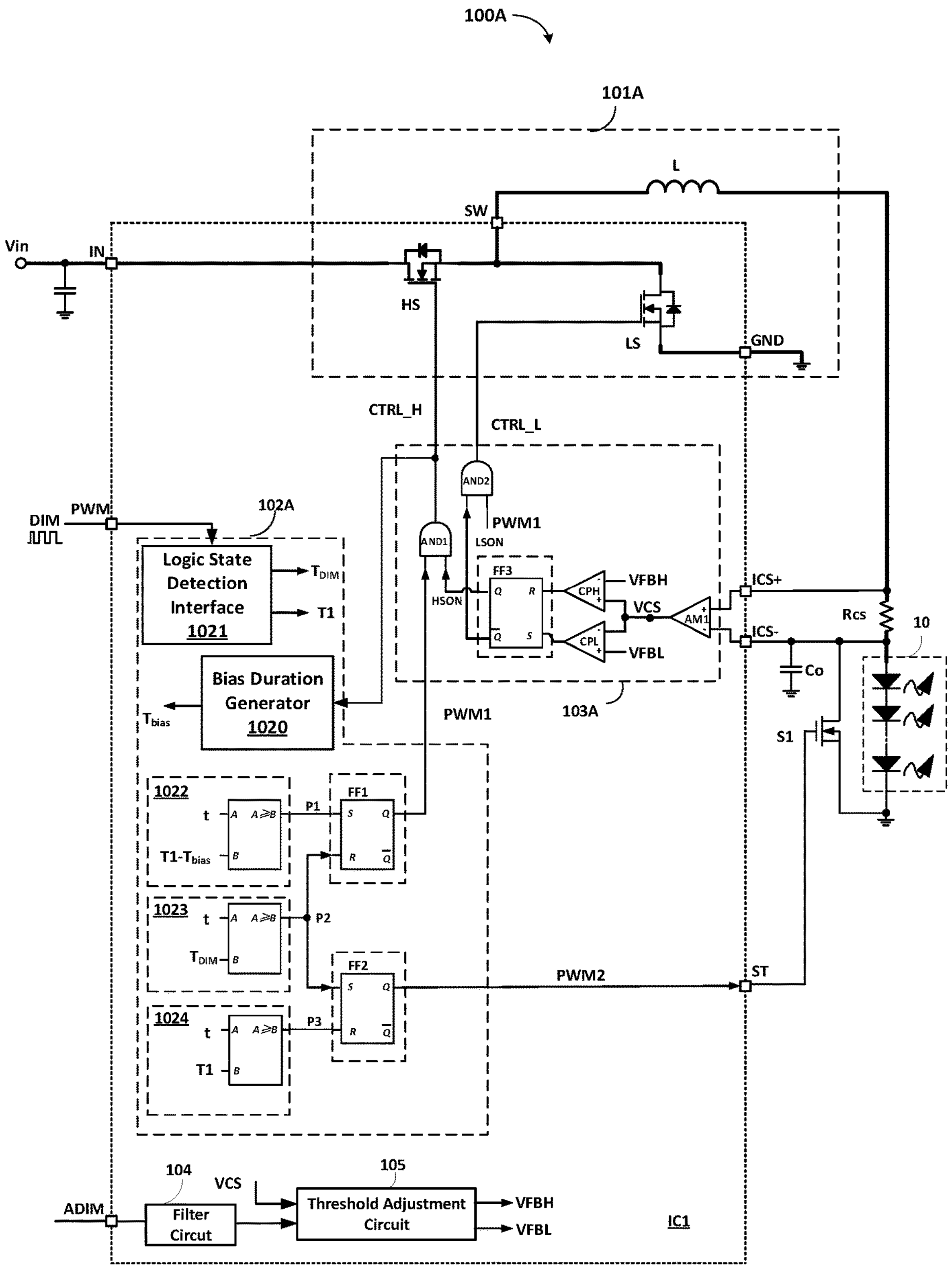
FIG. 2 shows a schematic circuit diagram of a light emitting element driving system 100A in accordance with an embodiment of the present invention.

FIG. 2 shows a schematic circuit diagram of a light emitting element driving system 100A in accordance with an embodiment of the present invention. As shown in FIG. 2, the light emitting element driving system 100A comprises a power converter 101A, a first control circuit 102A, a second control circuit 103A, and a shunt switch S1 connected in parallel with the light emitting element 10. The power converter 101A is configured to provide the driving current for the light emitting element 10. In the embodiment shown in FIG. 2, transistors HS and LS, the first control circuit 102A, the second control circuit 103A and multiple pins are integrated in a same integrated circuit driver IC1. A pin IN is used to receive an input voltage Vin, a pin GND is used to couple to a reference ground, transistors HS and LS are coupled in series between the pins IN and GND, and the common connection node of the two transistors HS and LS is coupled to a pin SW. The transistors HS and LS are configured to work as main power switches, together with external components (such as inductors, capacitors, etc.) coupled to the pin SW, to form the power converter 101A for providing an output current to the light emitting element 10. Those skilled in the art should understand that the power converter 101A can adopt any suitable control method, such as constant frequency peak current control, hysteresis control, and constant on-time control and so on.

In the embodiment shown in FIG. 2, the first control circuit 102A is coupled between a dimming pin PWM and a driving pin DRV. The dimming pin PWM is configured to receive the dimming signal DIM that is inputted externally. Based on a logic state of the dimming signal DIM in a last cycle, the first control circuit 102A provides a dimming process signal PWM1 in a current cycle to the second control circuit 103A and a shunt control PWM2 in the current cycle to a control terminal of the shunt switch S1, respectively. Both the dimming process signal PWM1 and the shunt control signal PWM2 have a first level and a second level. Further, the second control circuit 103A is coupled to the first control circuit 102A to receive the dimming process signal PWM1, based on the dimming process signal PWM1 and a feedback signal VCS representative of the output current of the power convertor 101A, control signals CTRL_H and CTRL_L are generated to control the transistors HS and LS, respectively. In detail, when the shunt control signal PWM2 has the first level, the shunt switch S1 is turned on, and the second control circuit 103A is configured to control the power converter 101A to work in the normal power operation state and the low power operation state in a time-sharing manner based on the dimming process signal PWM1. And when the shunt control signal PWM2 has the second level, the shunt switch S1 is turned off, and the second control circuit 103A controls the power converter 101A to work in the normal power operation state.

In the embodiment shown in FIG. 2, the first control circuit 102A comprises a logic state detection interface 1021, digital comparison circuits 1022~1024, flip-flops FF1 and FF2. In another embodiment, the first control circuit 102A comprises a microprocessor configured to receive the dimming signal DIM, to provide the dimming process signal PWM1 and the shunt control signal PWM2 based on the dimming signal DIM. In one embodiment, the microprocessor has memory units and counters.

In one embodiment, the logic state detection interface 1021 is configured to sample the inputted dimming signal DIM cycle by cycle, and to provide a first time duration T1 by timing a duration of the dimming signal DIM being the low level in the last cycle. The logic state detection interface 1021 is also configured to provide a second time duration $T_{DIM}$ by timing a cycle duration of the dimming signal DIM in the last cycle.

In one embodiment, a bias duration $T_{bias}$ is a preset value stored in a register of the first control circuit 102A. In another embodiment, the first control circuit 102A further comprises a bias duration generator 1020. The bias duration generator 1020 is configured to receive the control signal CTRL_H, and to provide the bias duration $T_{bias}$ to a difference duration generator (not shown) in real time based on a duty cycle D_CTRL_H of the control signal CTRL_H. The difference duration generator is configured to subtract the bias duration $T_{bias}$ from the first time duration T1, to provide a difference duration (T1−$T_{bias}$) at an output terminal.

The digital comparison circuit 1022 is configured to compare a timing duration t of the dimming process signal PWM1 being in the current cycle with the difference duration (T1-$T_{bias}$), and to provide a comparison signal P1 based on the comparison result. Further, the digital comparison circuit 1023 is configured to compare the timing duration t of the dimming process signal PWM1 being in the current cycle with the second time duration $T_{DIM}$, and to provide a comparison signal P2 based on the comparison result. In addition, the digital comparison circuit 1024 is configured to compare the timing duration t of the dimming process signal PWM1 being in the current cycle with the first time duration T1, and to provide a comparison signal P3 based on the comparison result. The flip-flop FF1 has a set terminal, a reset terminal and an output terminal, wherein the set terminal receives the comparison signal P1, and the reset terminal receives the comparison signal P2, and based on the comparison signal P1 and the comparison signal P2, the flip-flop FF1 provides the dimming process signal PWM1 in the current cycle at the output terminal. The flip-flop FF2 has a set terminal, a reset terminal and an output terminal, wherein the set terminal receives the comparison signal P2, and the reset terminal receives the comparison signal P3, and based on the comparison signal P2 and the comparison signal P3, the flip-flop FF2 provides the shunt control signal PWM2 in the current cycle at an output terminal to a control terminal of the shunt switch S1 through a pin ST, as shown in FIG. 2.

The second control circuit 103A is coupled to the current detection pins ICS+ and ICS−, and to detect a current flowing through an inductor L and a current sense resistor Rcs, to provide the feedback signal VCS representative of the output current. In the embodiment shown in FIG. 2, the second control circuit 103A comprises a differential current amplifier AM1, comparators CPH and CPL, a flip-flop FF3, and the AND gate circuits AND1 and AND2. The differential current amplifier AM1 is coupled to the two terminals of the current sense resistor Rcs, is configured to sample the output current i_out, to provide the feedback signal VCS representative of the output current i_out at the output terminal. The comparators CPH and CPH are configured to adjust the inductor current ripple, so that the feedback signal VCS changes periodically between an upper threshold voltage VFBH and a lower threshold voltage VFBL.

The comparator CPH has a first input terminal, a second input terminal and an output terminal, wherein the first input terminal receives the upper threshold voltage VFBH, and the second input terminal receives the feedback signal VCS representative of the current flowing from the SW pin. Similarly, the comparator CPL has a first input terminal, a second input terminal and an output terminal, wherein the first input terminal receives the lower threshold voltage VFBL, and the second input terminal receives the feedback signal VCS. The flip-flop FF3 has a first input terminal R, a second input terminal S, a first output terminal Q and a second output terminal /Q, wherein the first input terminal R is coupled to the output terminal of the comparator CPH, and the second input terminal S is coupled to the output terminal of the comparator CPL. The flip-flop FF3 generates signals HSON and LSON at the output terminals Q and /Q respectively, based on the output signals of the comparators COMH and COML. In the embodiment shown in FIG. 2, the feedback signal VCS is compared with the upper threshold voltage VFBH and the lower threshold voltage VFBL by using comparators CPH and CPL. In another embodiment, the comparators CPH and CPL can be replaced by a hysteretic comparator or other circuits with the similar function.

The AND gate circuit AND1 is configured to receive the dimming process signal PWM1 and the signal HSON, to generate the control signal CTRL_H. The AND gate circuit AND2 is configured to receive the dimming process signal PWM1 and the signal LSON, to generate the control signal CTRL_L. When the dimming process signal PWM1 is at the low level, the control signals CTRL_H and CTRL_L are kept at a low level, and the transistors HS and LS are both turned off. When the dimming process signal PWM1 is at the high level, the control signals CTRL_H and CTRL_L are equal to the signals HSON and LSON respectively, and the transistors HS and LS switch alternately, thereby converting the input voltage Vin to the driving current for the light emitting element 10.

The upper threshold voltage VFBH and the lower threshold voltage VFBL can be pre-determined. In another embodiment, they can also be adjusted by a user to meet the specific applications. In the embodiment shown in FIG. 2, the integrated circuit driver IC1 further comprises a pin ADIM, a filter circuit 104 coupled to the pin ADIM and a threshold adjustment circuit 105. The filter circuit 104 is configured to filter an analog dimming signal received through the pin ADIM, to provide a filtered signal to the threshold adjustment circuit 105. The threshold adjustment circuit 105 adjusts the upper threshold voltage VFBH and the lower threshold voltage VFBL in real time based on the filtered analog dimming signal and the feedback signal VCS. In some embodiments, the upper threshold voltage VFBH and the lower threshold voltage VFBL also vary with the input voltage Vin or a temperature of the integrated circuit driver IC1.

Figure 3:
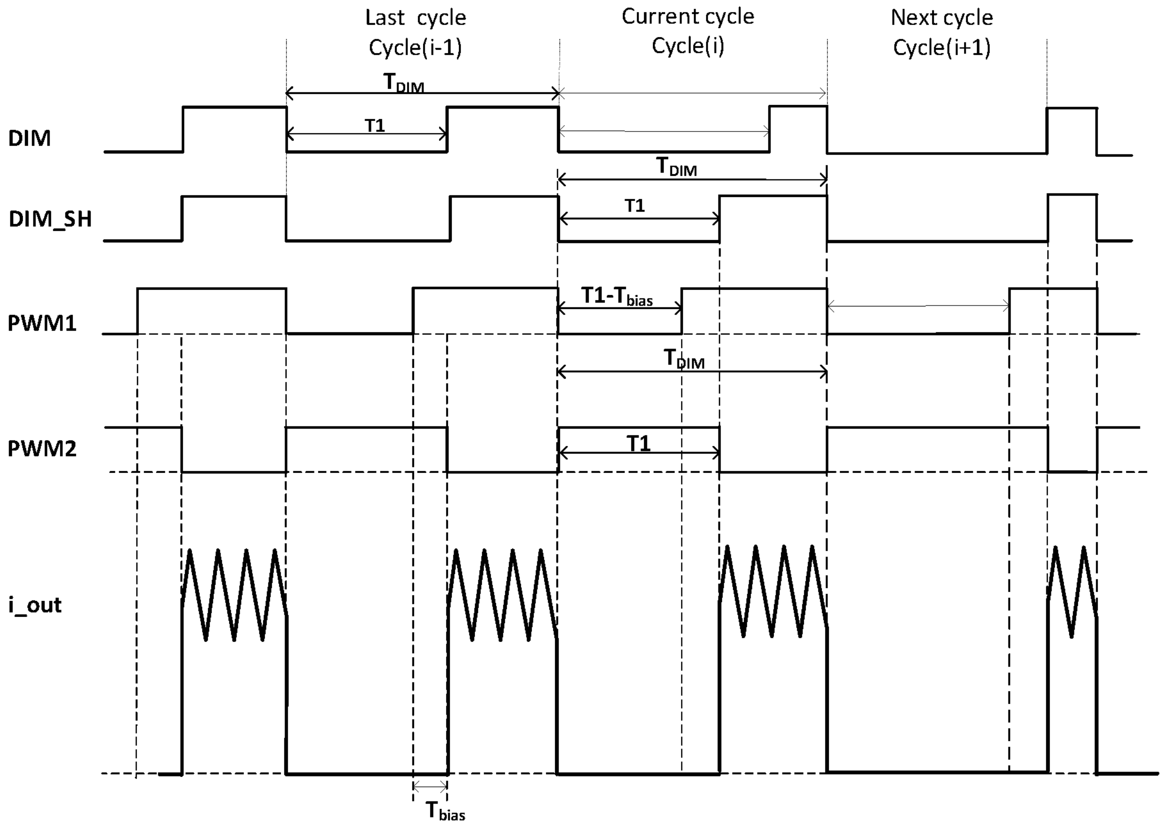
FIG. 3 shows a working waveform diagram of the light emitting element driving system 100A shown in FIG. 2 in accordance with an embodiment of the present invention.

FIG. 3 shows a working waveform diagram of the light emitting element driving system 100A shown in FIG. 2 in accordance with an embodiment of the present invention. As shown in FIG. 3, from top to bottom are the waveforms of the inputted dimming signal DIM, a dimming sampling signal DIM_SH sampled by the logic state detection interface 1021, the dimming process signal PWM1, the shunt control signal PWM2 and the output current i_out. Wherein the dimming signal DIM has a variable duty cycle and/or a variable frequency.

After the integrated circuit driver IC1 is powered on, the logic state detection interface 1021 is configured to detect a falling edge of the dimming signal DIM, and to start a new cycle once detecting a falling edge of the dimming signal DIM. The logic state detection interface 1021 samples the dimming signal DIM and provides the dimming sampling signal DIM_SH. As shown in FIG. 3, the dimming sampling signal DIM_SH lags the dimming signal DIM by an entire cycle duration (i.e., $T_{DIM}$) of the dimming signal DIM. The first time duration T1 represents the duration of the dimming signal DIM being the low level in the last cycle Cycle(i−1), and the second time duration T2 represents the cycle duration of the dimming signal DIM in the last cycle Cycle(i−1). The bias duration $T_{bias}$ shown in FIG. 3 can be pre-determined or related to the duty cycle of the control signal.

When the last cycle Cycle(i−1) ends and the current cycle Cycle(i) is about to start, the falling edge of the dimming signal DIM comes, and the dimming sampling signal DIM_SH changes from high level to low level, and meantime the falling edge of the dimming process signal PWM1 also comes. Conversely, the shunt control signal PWM2 switches from the low level to the high level. When the timing duration t of the dimming process signal PWM1 in the current cycle Cycle(i) reaches the difference duration (T1-$T_{bias}$), the dimming process signal PWM1 switches from the low level to the high level. When the timing duration t of the dimming process signal PWM1 being in the current cycle Cycle(i) reaches the first time duration T1, the shunt control signal PWM2 switches from a high level to a low level. When the timing duration t of the dimming process signal PWM2 in the current cycle Cycle(i) reaches the second time duration $T_{DIM}$, the dimming process signal PWM1 is switched from the high level to the low level, and meantime the shunt control signal PWM2 is switched from the low level to the high level.

Figure 4:
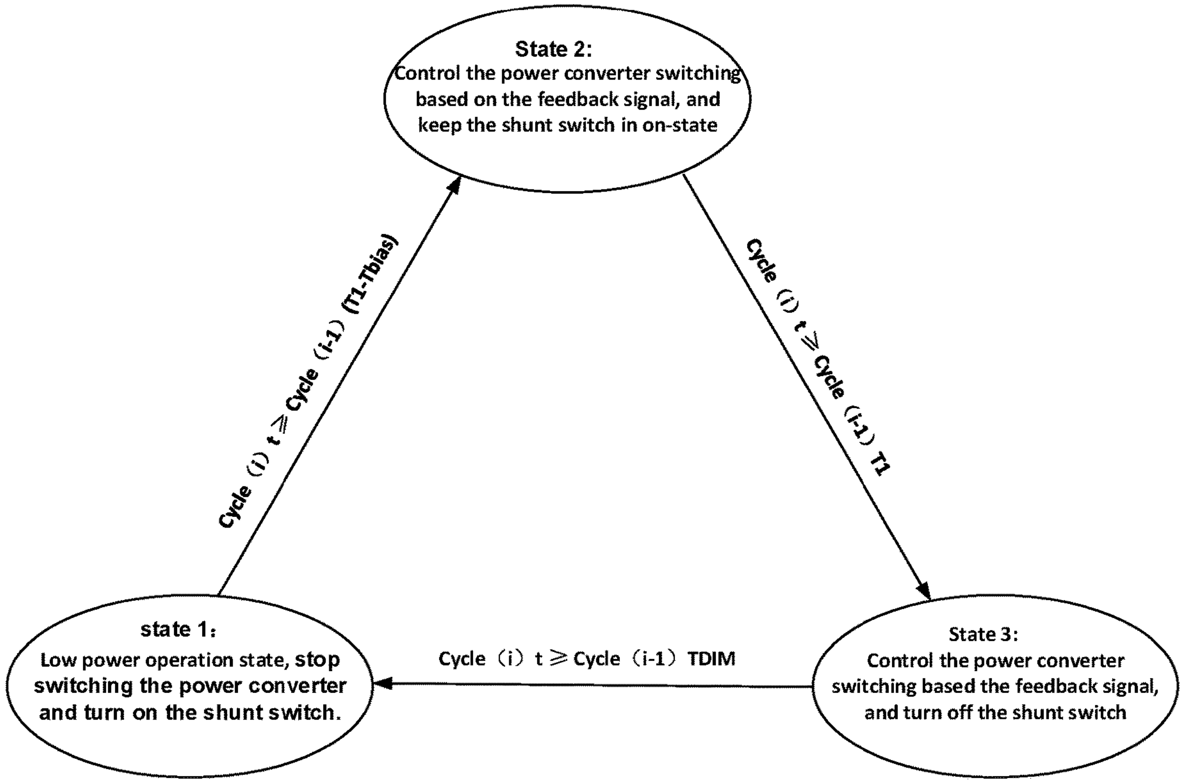
FIG. 4 shows a working status diagram of the power convertor in a cycle of the dimming signal in accordance with an embodiment of the present invention.

FIG. 4 shows a working status diagram of the power convertor in a cycle of the dimming signal in accordance with an embodiment of the present invention. As shown in FIG. 4, in each cycle of the dimming signal DIM, the power converter 101A works in three states, which are described in detail as follows.

In a first state, the shunt switch S1 is turned on, and the dimming process signal PWM1 has the low level, so the power converter 101A works in a low power operation state. The switching of the power converter 101A is stopped.

When the timing duration t of the dimming process signal PWM1 being in the current cycle Cycle(i) reaches the difference duration ($T1-T_{bias}$) of the dimming signal DIM in the last cycle Cycle(i−1), the power converter 101A changes from the first state to a second state, the dimming process signal PWM1 switches from the low level to the high level, and the power converter 101A switches from the low power operation state to a normal power operation state, the switching of the power converter 101A is controlled based on the feedback signal VCS, while the shunt switch S1 remains on-state.

Until the timing duration t of the dimming process signal PWM1 in the current cycle Cycle(i) reaches the first time duration T1 of the dimming signal DIM in the last cycle Cycle(i−1), the power converter 101A switches from the second state to a third state, the shunt switch S1 is turned off, and the power converter 101A maintains the normal power operation, to control the switching of the power converter 101A based on the feedback signal VCS.

When the timing duration t of the dimming process signal PWM1 in the current cycle Cycle(i) reaches the second time duration $T_{DIM}$ of the dimming signal DIM in the last cycle Cycle(i−1), the power converter 101A switches from the third state to the first state. The shunt switch S1 is turned on, and the power converter 101A switches from the normal power operation state to the low power operation state. The switching of the power converter 101A is stopped. The above process is repeated continuously, so that the power converter 101A and the shunt switch S1 work in the three states in each cycle of the dimming signal DIM.

Figure 5:
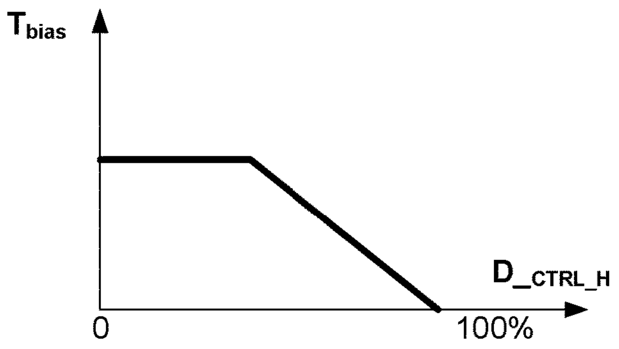
FIG. 5 shows a relationship diagram of the bias duration and a duty cycle of a control signal in accordance with an embodiment of the present invention.

FIG. 5 shows a relationship diagram between the bias duration and a duty cycle of a control signal in accordance with an embodiment of the present invention. In the embodiment shown in FIG. 5, when the duty cycle D_CTRL_H of the control signal CTRL_H is small, for example, less than 30%, the bias duration $T_{bias}$ remains constant. As the duty ratio D_CTRL_H of the control signal CTRL_H increases, the bias duration $T_{bias}$ decreases accordingly.

Figure 6:
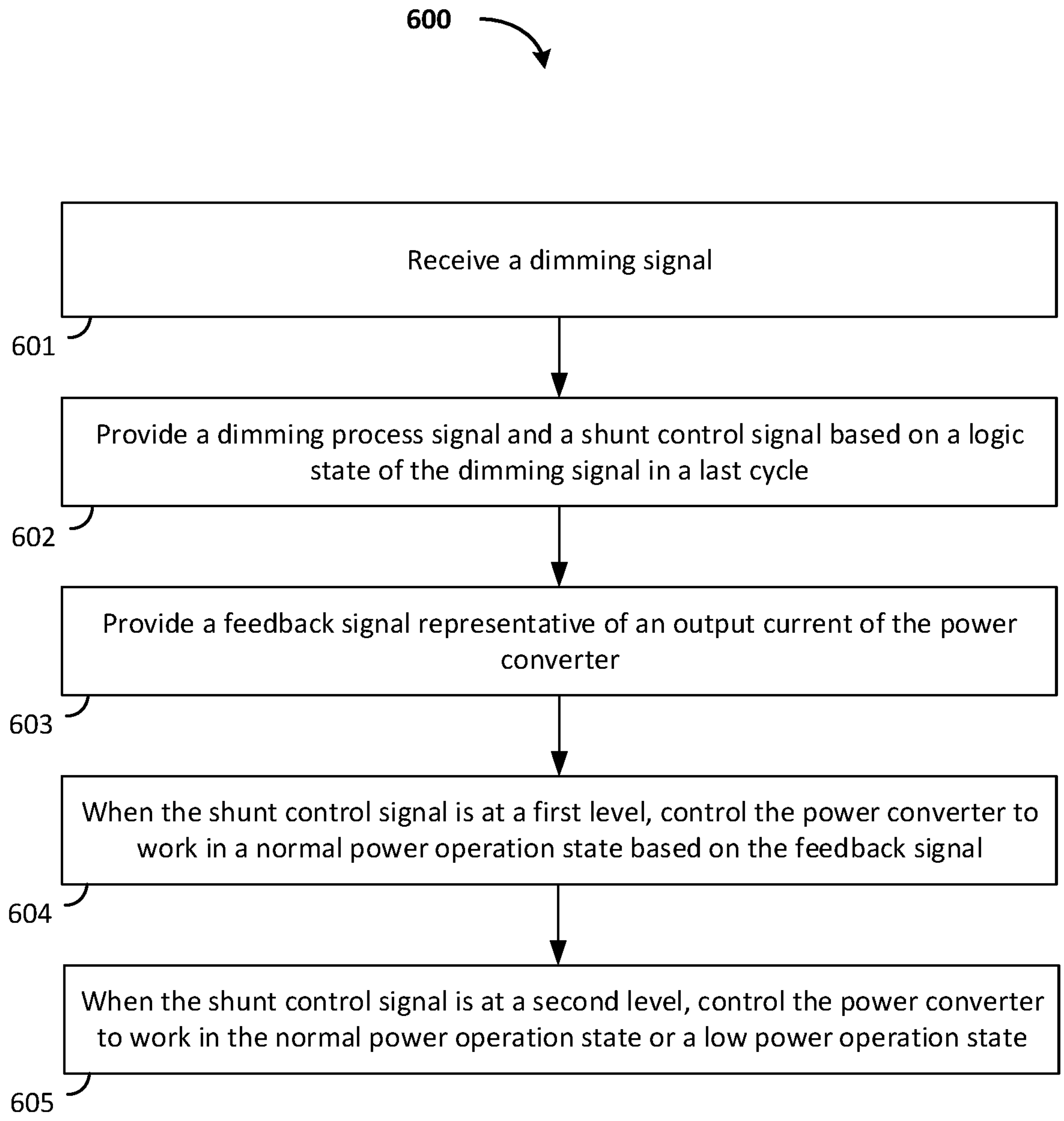
FIG. 6 shows a flow diagram of a control method 600 used in a light emitting element driver in accordance with an embodiment of the present invention.

FIG. 6 shows a flow diagram of a control method 600 used in a light emitting element driver in accordance with an embodiment of the present invention. The light emitting element driver comprises a power converter providing an output current for the light emitting element and a shunt switch connected in parallel with the light-emitting element, and the control method comprises steps 601-605.

At step 601, an external dimming signal is received, after the start-up of a driver IC finishes.

At step 602, a dimming process signal and a shunt control signal are provided based on a logic state of the dimming signal. Both the dimming process signal and the shunt control signal have a first level and a second level.

At step 603, a feedback signal representative of the output current of the power converter is provided.

At step 604, when the shunt control signal has a first level, the shunt switch is turned on, and the power converter is controlled to work in a normal power operation and a low power operation in time-time sharing manner based on the dimming process signal.

In one embodiment, when the dimming process signal is at the high level, the power converter is controlled to work in the normal power operation state based on the feedback signal, and the power converter performs switching operation to provide an output power for the light emitting element. When the dimming process signal is at the low level, the switching operation of the power converter is stopped. The power converter works in the low power operation state and stops providing the output power for the light emitting element, while the control circuit of the power converter is still working, to provide the feedback signal representative of the output current and to receive the dimming process signal.

At step 605, when the shunt control signal is at a second level, the shunt switch is turned off, and the power converter is controlled to work in the normal power operation state.

Figure 7:
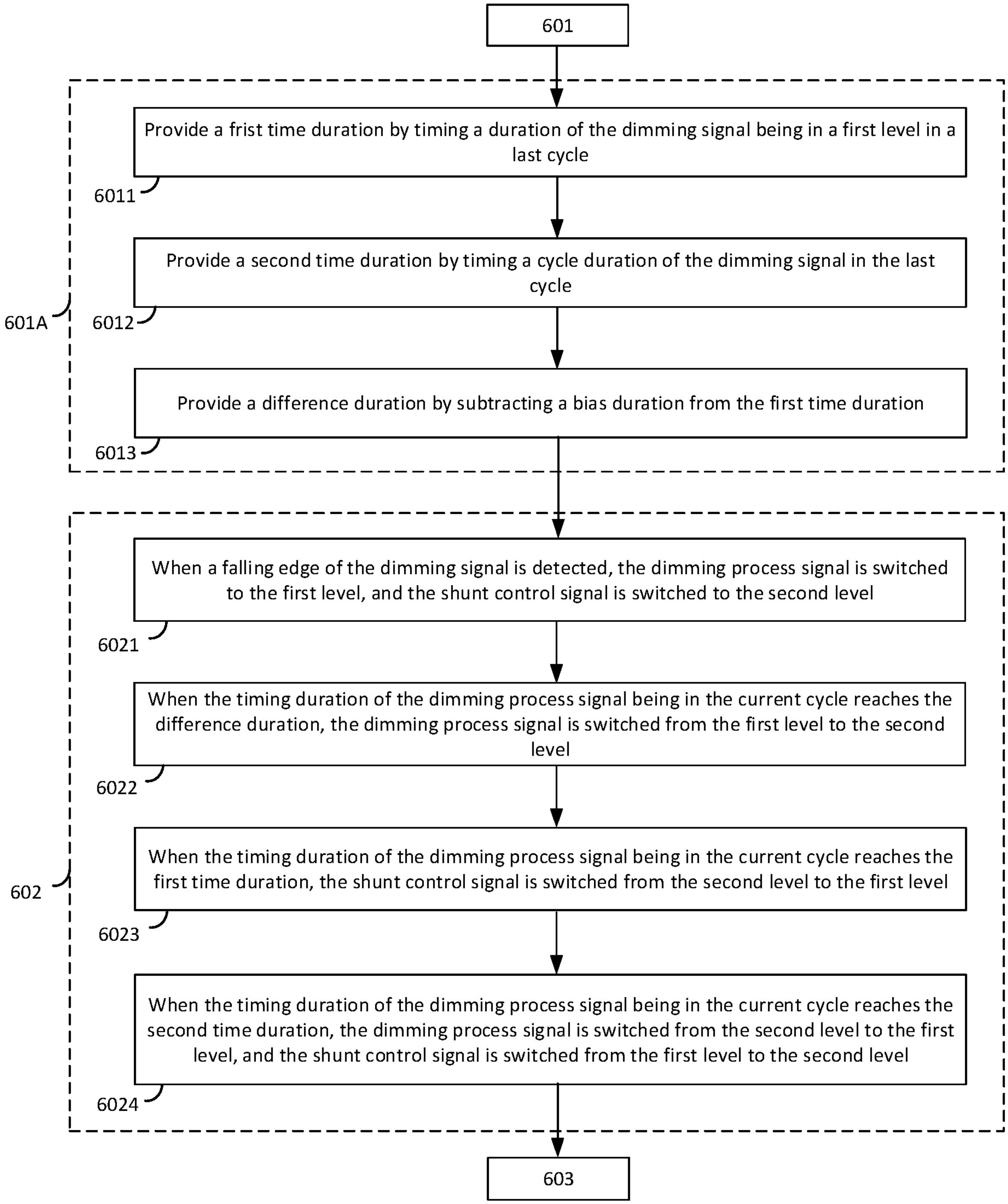
FIG. 7 shows a flow diagram of a control method between the steps 601 and 603 in accordance with an embodiment of the present invention.

FIG. 7 shows a flow diagram of a control method between the steps 601 and 603 in accordance with an embodiment of the present invention. In the embodiment shown in FIG. 7, the control method 600 further comprises a step 601A. The step 601A is used to sample the dimming signal and comprises steps 6011-6013.

At step 6011, a duration of the dimming signal being the first level in the last cycle is timed to provide a first time duration.

At step 6012, a cycle duration of the dimming signal in the last cycle is timed to provide a second time duration.

At step 6013, a bias duration is subtracted from the first time duration to provide a difference duration. In one embodiment, the bias duration is a pre-determined value. In another embodiment, the bias duration decreases as the duty cycle of the control signal increases. In yet another embodiment, the bias duration varies linearly or non-linearly with the duty cycle of the control signal.

In one embodiment, as shown in FIG. 7, the step 602 further comprises steps 6021-6024.

At step 6021, when a falling edge of the dimming signal is detected, the dimming process signal is switched to the first level, and the shunt control signal is switched to the second level.

At the step 6022, when the timing duration of the dimming process signal in the current cycle reaches the difference duration, the dimming process signal is switched from the first level to the second level.

At the step 6023, when the timing duration of the dimming process signal in the current cycle reaches the first time duration, the shunt control signal is switched from the second level to the first level.

At the step 6024, when the timing duration of the dimming process signal in the current cycle reaches the second time duration, the dimming process signal is switched from the second level to the first level, and meantime the shunt control signal is switched from the first level to the second level.

It is noted that in the flow charts described above, the functions labelled in the boxes shown in FIG. 6 or FIG. 7 can also occur in a different sequence. For example, two consecutive blocks, in fact, can be executed substantially concurrently, or they may sometimes be executed in the reverse order, depending upon the particular function involved.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously, many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated, and they obviously will be resorted to by those skilled in the art without departing from the spirit and the scope of the invention as hereinafter defined by the appended claims as only a preferred embodiment(s) thereof has been disclosed.

What is claimed is:

1. A control circuit for a light emitting element driver, the light emitting element driver has a power converter for providing an output current to the light emitting element and a shunt switch connected in parallel with the light emitting element, the control circuit comprising:

a first control circuit configured to receive a dimming signal and to provide a dimming process signal and a shunt control signal based on the dimming signal, wherein both the dimming process signal and the shunt control signal have a first level and a second level; and a second control circuit configured to receive the dimming process signal and a feedback signal representative of the output current, wherein when the shunt control signal is at a first level, the shunt switch is turned on, the second control circuit is configured to control the power converter to work in a normal power operation state and a low power operation state in a time-sharing manner, and when the shunt control signal is at a second level, the shunt switch is turned off, the second control circuit is configured to control the power converter to work in the normal power operation state.

2. The control circuit of claim 1, wherein during the shunt control signal is at the first level:

when the dimming signal is at the second level, the second control circuit is configured to provide a control signal based on the feedback signal, to control the power converter to work in the normal power operation state, the control signal is configured to control the power converter switching to provide an output power for the light emitting element; and when the dimming signal is at the first level, the second control circuit is configured to stop switching the power converter, to control the power converter to work in the low power operation state and to stop providing the output power for the light emitting element.

3. The control circuit of claim 2, wherein:

when a timing duration of the dimming process signal being in a current cycle exceeds a difference duration between a duration of the dimming signal being the first level in a last cycle and a bias duration, the dimming process signal is switched from the first level to the second level;

when the timing duration of the dimming process signal being in the current cycle exceeds the duration of the dimming signal being the first level in the last cycle, the shunt control signal is switched from the second level to the first level; and when the timing duration of the dimming process signal being in the current cycle exceeds a cycle duration of the dimming signal in the last cycle, the dimming process signal is switched from the second level to the first level, and the shunt control signal is switched from the second level to the first level.

4. The control circuit of claim 3, wherein the first control circuit comprises:

a logic state detection interface configured to provide a first time duration by timing the duration of the dimming signal being the first level in the last cycle and to provide a second time duration by timing the cycle duration of the dimming signal in the last cycle;

a first digital comparation circuit configured to compare the timing duration of the dimming process signal being in the current cycle with the second time duration, and to provide a first comparison signal based on the comparison;

a second digital comparation circuit configured to compare the timing duration of the dimming process signal being in the current cycle with the first time duration, and to provide a second comparison signal based on the comparison;

a first flip-flop having a set terminal, a reset terminal and an output terminal, wherein the set terminal is configured to receive the first comparison signal, the reset terminal is configured to receive the second comparison signal, and based on the first comparison signal and the second comparison signal, the first flip-flop provides the shunt control signal at the output terminal;

a difference duration generator configured to subtract the bias duration from the first time duration and to provide the difference duration;

a third comparison circuit configured to compare the timing duration of the dimming process signal being in the current cycle with the difference duration, and to provide a third comparison signal; and a second flip-flop having a set terminal, a reset terminal and an output terminal, wherein the set terminal is configured to receive the third comparison signal, the reset terminal is configured to receive the second comparison signal, based on the third comparison signal and the second comparison signal, the second flip-flop provides the dimming process signal at the output terminal.

5. The control circuit of claim 4, further comprising:

a bias duration generator having an input terminal and an output terminal, wherein the input terminal is coupled to receive the control signal, the output terminal is coupled to an input terminal of the difference duration generator, the bias duration generator provides the bias duration at the output terminal based on a duty cycle of the control signal.

6. The control circuit of claim 1, wherein the first control circuit comprises a microprocessor configured to receive the dimming signal and to provide both the dimming process signal and the shunt control signal based on the dimming signal, the microprocessor comprises a memory and a counter.

7. The control circuit of claim 1, wherein the first control circuit and the second control circuit are modularized in an enclosure.

8. A light emitting element driver, comprising:
- a power converter configured to provide an output current for the light emitting element;
- a shunt switch coupled in parallel with the light emitting element;
- a first control circuit configured to receive a dimming signal and to provide a dimming process signal and a shunt control signal based on the dimming signal, wherein both the dimming process signal and the shunt control signal have a first level and a second level; and
- a second control circuit configured to receive the dimming process signal and a feedback signal representative of the output current, wherein when the shunt control signal is at a first level, the shunt switch is turned on, the second control circuit is configured to control the power converter to work in a normal power operation state or a low power operation state, and when the shunt control signal is at a second level, the shunt switch is turned off, the second control circuit is configured to control the power converter to work in the normal power operation state.

9. The light emitting element driver of claim 8, wherein during the shunt control signal is at the first level:
- when the dimming signal is at the second level, the second control circuit is configured to provide a control signal based on the feedback signal, to control the power converter to work in the normal power operation state, the control signal is configured to control the power converter switching, to provide an output power for the light emitting element; and
- when the dimming signal is at the first level, the second control circuit is configured to stop switching the power converter, to control the power converter to work in the low power operation state and to stop providing the output power for the light emitting element.

10. The light emitting element driver of claim 9, wherein:
- when a timing duration of the dimming process signal being in a current cycle exceeds a difference duration between a duration of the dimming signal being the first level in a last cycle and a bias duration, the dimming process signal is switched from the first level to the second level;
- when the timing duration of the dimming process signal being in the current cycle exceeds the duration of the dimming signal being the first level in the last cycle, the shunt control signal is switched from the second level to the first level; and
- when the timing duration of the dimming process signal being in the current cycle exceeds a cycle duration of the dimming signal in the last cycle, the dimming process signal is switched from the second level to the first level, and the shunt control signal is switched from the second level to the first level.

11. The light emitting element driver of claim 10, wherein the first control circuit comprising:
- a logic state detection interface configured to provide a first time duration by timing the duration of the dimming signal being the first level in the last cycle and to provide a second time duration by timing the cycle duration of the dimming signal in the last cycle;
- a first digital comparation circuit configured to compare the timing duration of the dimming process signal being in the current cycle with the second time duration, and to provide a first comparison signal based on the comparison;
- a second digital comparation circuit configured to compare the timing duration of the dimming process signal being in the current cycle with the first time duration, and to provide a second comparison signal based on the comparison;
- a first flip-flop having a set terminal, a reset terminal and an output terminal, wherein the set terminal is configured to receive the first comparison signal, the reset terminal is configured to receive the second comparison signal, and based on the first comparison signal and the second comparison signal, the first flip-flop provides the shunt control signal at the output terminal;
- a difference duration generator configured to subtract the bias duration from the first time duration and to provide the difference duration;
- a third comparison circuit configured to compare the timing duration of the dimming process signal being in the current cycle with the difference duration, and to provide a third comparison signal; and
- a second flip-flop having a set terminal, a reset terminal and an output terminal, wherein the set terminal is configured to receive the third comparison signal, the reset terminal is configured to receive the second comparison signal, based on the third comparison signal and the second comparison signal, the second flip-flop provides the dimming process signal at the output terminal.

12. The light emitting element driver of claim 11, further comprising:
- a bias duration generator having an input terminal and an output terminal, wherein the input terminal is coupled to receive the control signal, the output terminal is coupled to an input terminal of the difference duration generator, the bias duration generator provides the bias duration at the output terminal based on a duty cycle of the control signal.

13. The light emitting element driver of claim 8, wherein the first control circuit comprises a microprocessor configured to receive the dimming signal and to provide both the dimming process signal and the shunt control signal based on the dimming signal, the microprocessor comprises a memory and a counter.

14. The light emitting element driver of claim 8, wherein the first control circuit and the second control circuit are modularized in an enclosure.

15. A control method for a light emitting element driver, the light emitting element driver has a power converter for providing an output current to the light emitting element, and a shunt switch connected in parallel with the light emitting element, and the control method comprising:
- receiving a dimming signal;
- providing a dimming process signal and a shunt control signal based on a logic state of the dimming signal, wherein both the dimming process signal and the shunt control signal have a first level and a second level;
- providing a feedback signal representative of the output current;
- when the shunt control signal is at a first level, the shunt switch is turned on, controlling the power converter to work in a normal power operation state or a low power operation state; and
- when the shunt control signal is at a second level, the shunt switch is turned off, controlling the power converter to work in the normal power operation state.

16. The control method of claim 15, wherein during the shunt control signal is at the first level:

when the dimming signal is at the second level, providing a control signal for the power converter based on the feedback signal, to control the power converter to work in the normal power operation, the control signal is configured to control the power converter switching to provide an output power for the light emitting element; and when the dimming signal is at the first level, stopping switching the power converter, to control the power converter to work in the low power operation state and to stop providing the output power for the light emitting element.

17. The control method of claim 16, further comprising:

providing a first time duration by timing a duration of the dimming signal being the first level in a last cycle;

providing a second time duration by timing a cycle duration of the dimming signal in the last cycle; and providing a difference duration by subtracting a bias duration from the first time duration.

18. The control method of claim 17, wherein providing the dimming process signal and the shunt control signal further comprising:

when the falling edge of the dimming signal is detected, the dimming process signal is switched to the first level, and the shunt control signal is switched to the second level;

when the timing duration of the dimming process signal being in the current cycle reaches the difference duration, the dimming process signal is switched from the first level to the second level;

when the timing duration of the dimming process signal being in the current cycle reaches the first time duration, the shunt control signal is switched from the second level to the first level; and when the timing duration of the dimming process signal being in the current cycle reaches the second time duration, the dimming process signal is switched from the second level to the first level, and the shunt control signal is switched from the first level to the second level.

19. The control method of claim 16, further comprising:

receiving the control signal; and providing the bias duration based on the control signal.

20. The control method of claim 19, wherein the bias duration decreases when the duty cycle of the control signal increases.

* * * * *